United States Patent [19]

May et al.

[11] Patent Number: 4,619,358

[45] Date of Patent: Oct. 28, 1986

[54] CONVEYOR ASSEMBLY

[75] Inventors: Wayne A. May, Sunrise; Donald J. Peters, Boca Raton, both of Fla.

[73] Assignee: Jensen Corporation, Fort Lauderdale, Fla.

[21] Appl. No.: 667,373

[22] Filed: Nov. 1, 1984

[51] Int. Cl.⁴ ............................................. B65G 47/26
[52] U.S. Cl. .................................... 198/457; 198/599; 198/636
[58] Field of Search ............... 198/457, 597, 599, 817, 198/606, 841, 636

[56] References Cited

U.S. PATENT DOCUMENTS

| | | | |
|---|---|---|---|
| 1,479,866 | 1/1924 | Moores | 198/606 |
| 2,504,948 | 4/1950 | Ferguson | 198/606 |
| 2,759,283 | 8/1956 | Bowman et al. | 198/817 |
| 3,440,974 | 4/1969 | Ruiz | 198/457 |
| 3,605,980 | 9/1971 | Donahue et al. | 198/457 |
| 3,627,108 | 12/1971 | Hansen | 198/817 |

FOREIGN PATENT DOCUMENTS 562129  5/1975  Switzerland .

Primary Examiner—Joseph E. Valenza
Assistant Examiner—Kyle E. Shane
Attorney, Agent, or Firm—Oltman & Flynn

[57] ABSTRACT

A conveyor assembly having a first, generally, horizontal, endless belt conveyor and a second, generally horizontal, endless belt conveyor extending perpendicular to the first conveyor and with its trailing end overlapped with the leading end of the first conveyor to carry articles away from the first conveyor. Each conveyor has several laterally spaced belts. Where the conveyors overlap their belts are interleaved to transfer articles properly from the first conveyor onto the second conveyor. The second conveyor has a top piece just below the upper course of travel for its belt with an opening having round-tipped, tapered teeth at the front to prevent the strings or the like on a laundry article being conveyed from getting tangled in the drive roller at the leading end of this conveyor.

10 Claims, 6 Drawing Figures

4,619,358

CONVEYOR ASSEMBLY

SUMMARY OF THE INVENTION

This invention is directed to a conveyor assembly which conveys articles first in one direction and then continues in a second direction transverse to the first.

In accordance with the presently preferred embodiment of this invention, the conveyor assembly has a first endless laced belt conveyor which carries the articles in a horizontal, straight-line, first path and a second endless laced belt conveyor which receives the articles from the first conveyor and carries them away from the first conveyor in a generally horizontal, straight-line, second path at an angle to the first path. The first and second conveyors each have a plurality of belts in succession across the width of the conveyor which cross over one another in a novel manner at a junction between the two conveyors to insure the proper transfer and change of direction of the articles from the first conveyor onto the second.

One feature of the present conveyor assembly is a novel interleaved belt arrangement of the first and second conveyors which acts to keep long articles substantially centered on the second conveyor, after they are automatically transferred from a centered position on the first conveyor and to prevent the trailing end of such an article from hanging over or falling off at the inside edge of the conveyor assembly.

Another feature of the present conveyor assembly is a novel belt arrangement adjacent the outside corner which acts to prevent small articles from falling off when moving from the first conveyor onto the second conveyor and changing direction.

Another feature of the present conveyor assembly is a novel arrangement of the respective belts of the two conveyors which prevents laundry articles, for example, from getting caught between the two conveyors.

Another aspect of this invention is a novel arrangement on the second conveyor which effectively prevents laces on hospital gowns, for example, from getting tangled in the drive roller at the driven end of this conveyor.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
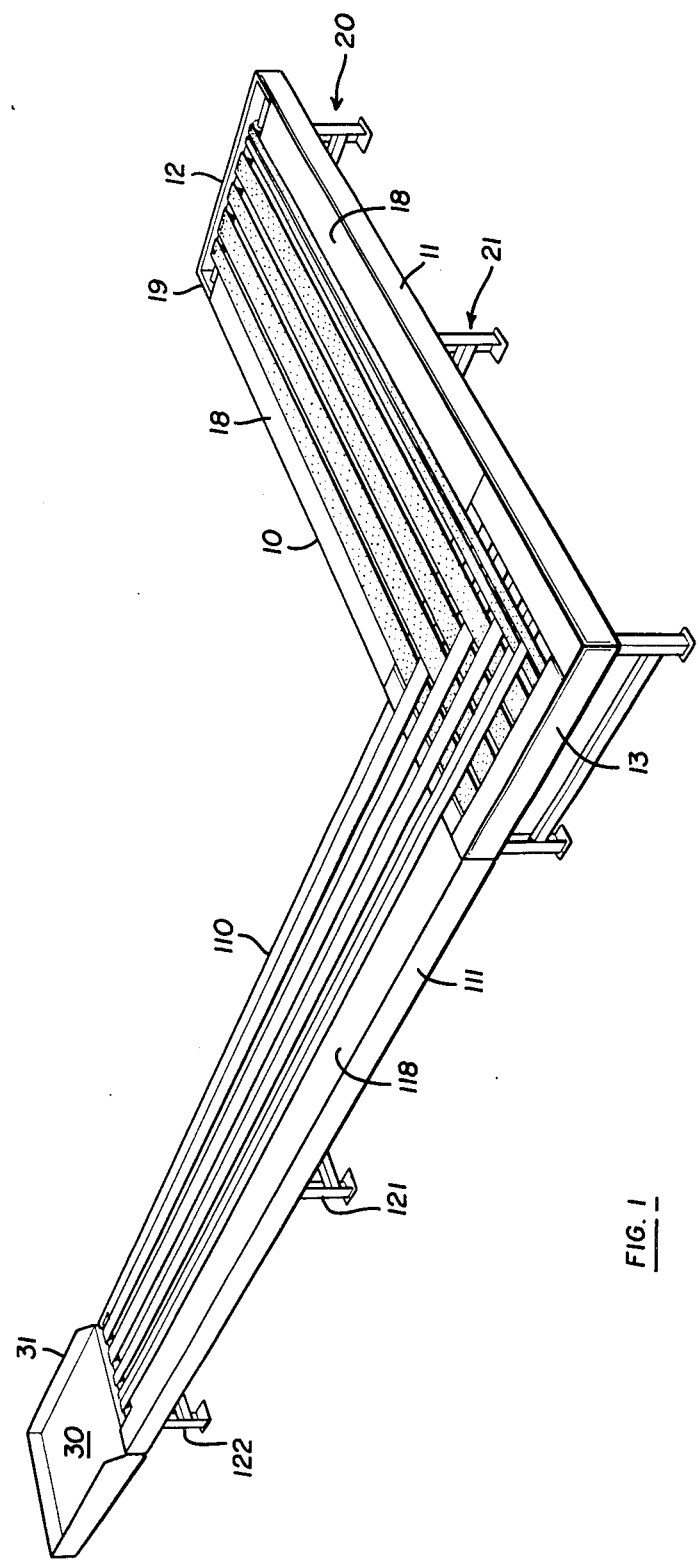
FIG. 1 is a perspective view of a conveyor assembly in accordance with the present invention.

Referring to FIG. 1, the present apparatus has a rigid framework which is generally L-shaped, viewed from above.

Figure 6:
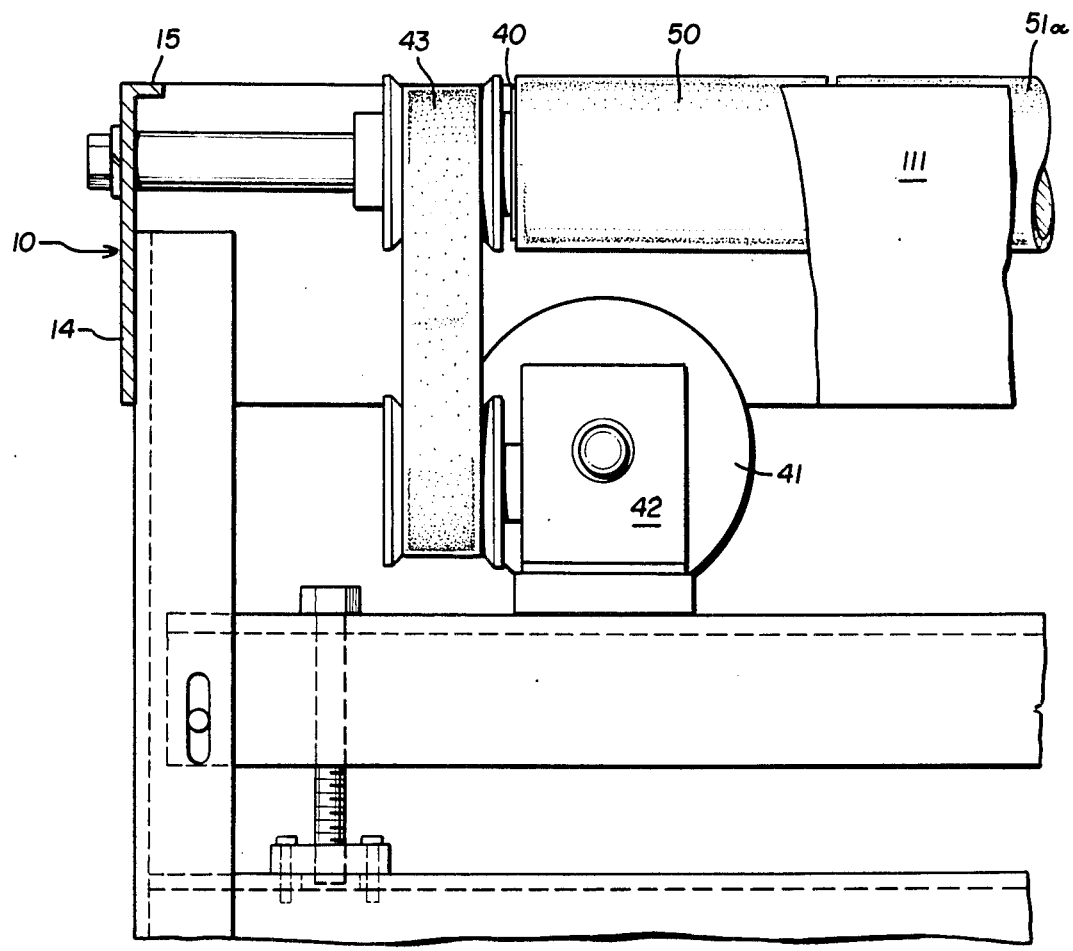
FIG. 6 is a view taken along the line 6—6 in FIG. 2.

One leg of this "L" has a horizontally elongated straight inner side 10, an elongated straight outer side 11 extending parallel to the inner side, and straight opposite ends 12 and 13 extending between and joining the sides 10 and 11. As shown in FIG. 6, where it is joined to the end 13 of the frame, the inner side 10 has a vertical segment 14 extending down from a short horizontal lip 15 at the top. A short distance to the right in FIG. 2 from this end, the inner side 10 presents a horizontal shelf 16 at the top which is substantially coplanar with the top lip 15 and projects a substantial distance toward the outer side 11 of this leg of the frame. As shown in FIG. 4, shelf 16 terminates away from the side 10 of the frame is a downwardly inclined lip 17. To the right of shelf 16 in FIG. 2, the inner side 10 of this leg of the frame carries a horizontal top 18 which is coplanar with shelf 16 and extends over to the outer side 11 of this leg of the frame and is joined rigidly to it. The top 18 terminates at its right end edge 19 in FIG. 2 a short distance from the end 12 of this leg of the frame. This leg of the frame is supported at a suitable distance above the floor by rigid leg structures 20, 21 and 22, the details of which are not important to the present invention and therefore will not be described in detail.

Figure 4:
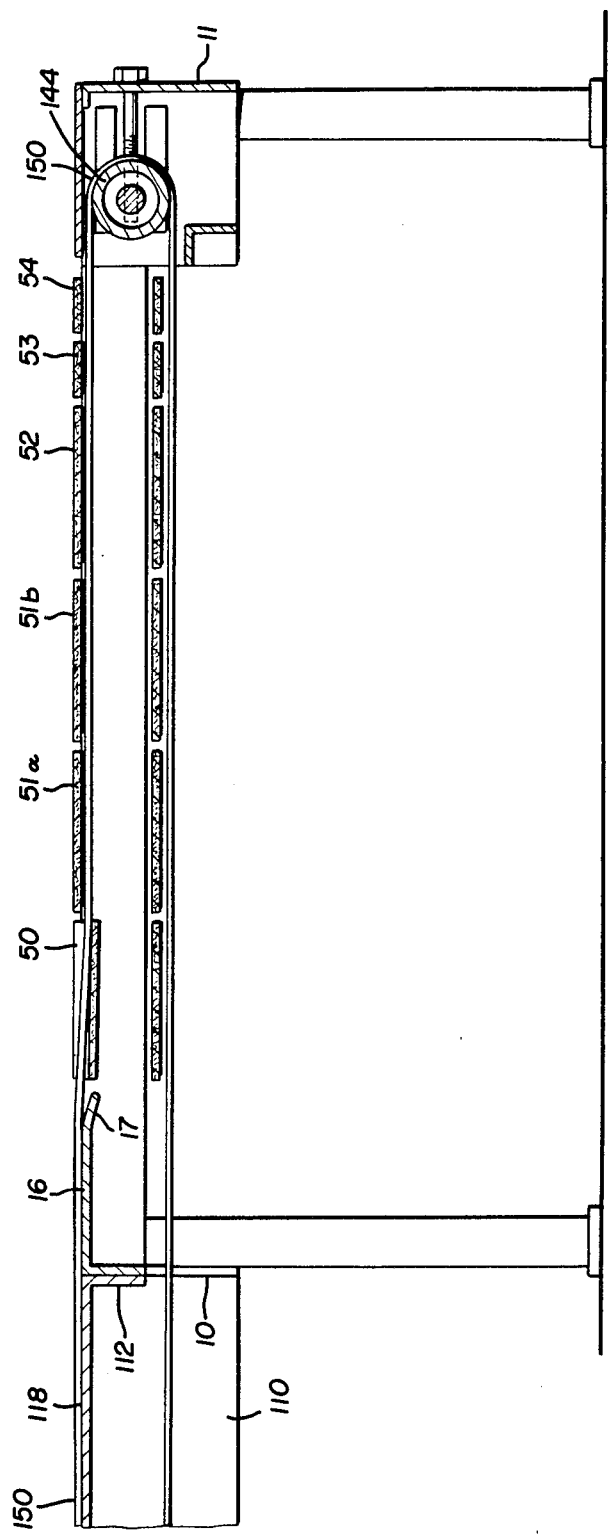
FIG. 4 is a fragmentary, vertical cross-section taken along the line 4—4 in FIG. 2.
Figure 5:
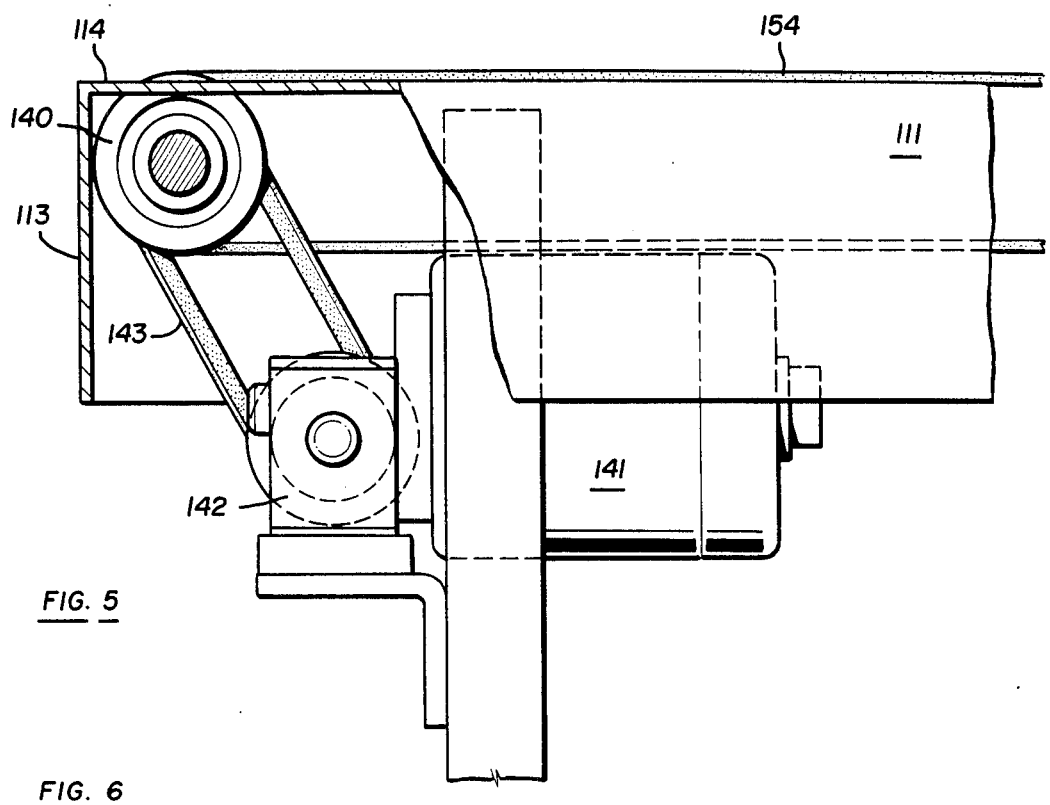
FIG. 5 is a fragmentary vertical section taken along the line 5—5 in FIG. 2.

The other leg of the L-shaped frame has a generally horizontal elongated inner side 110 which extends perpendicularly from the inner side 10 of the first leg of the "L", a parallel outer side 111 which extends perpendicular to the outer side 11 as a continuation of the end 13 of the first leg of the "L", an end wall 112 (FIG. 4) joined to the inner side 10 of the first leg adjacent the end wall 13, and an opposite end wall 113 (FIG. 5). Beyond the end wall 113 this second leg of the L-shaped frame supports a horizontal table 30 with raised sides 31 for receiving the articles from the conveyor. This leg of the frame is supported at the same height as the first leg by rigid leg assemblies 121 and 122 (FIG. 1). It presents a horizontal top 118 extending between its opposite sides 110 and 111 from its end wall 112 almost to its opposite end wall 113.

Figures 2, 3:
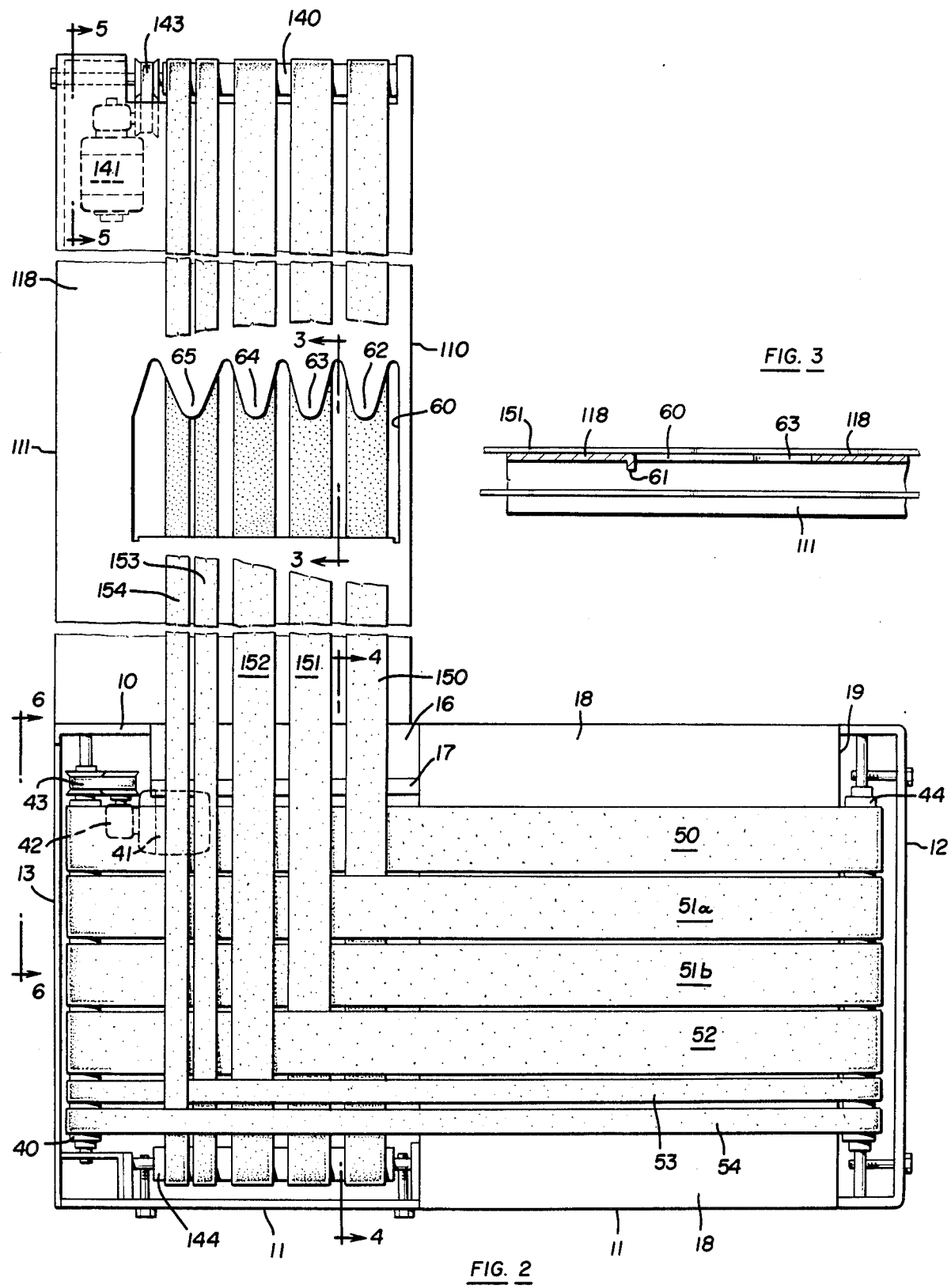
FIG. 2 is a top plan view of this conveyor assembly.
FIG. 3 is a fragmentary, longitudinal, vertical section taken along the line 3—3 in FIG. 2.

In FIG. 2 a short distance inward (to the right) from its end 13 the frame supports a motor-driven, horizontal, conveyor drive roller 40, the opposite ends of which are rotatably supported in the opposite sides 10 and 11 of the frame by suitable anti-friction bearings. As shown in FIG. 6, an electric motor 41 for driving the roller 40 is mounted on the frame below. This motor is drivingly coupled to roller 40 through a conventional drive arrangement which includes a gear reduction 42 and a pulley belt 43 which may be a V-belt. Near the opposite end 12 of the first leg of the frame, a horizontal idler roller 44 (FIG. 2) is rotatably supported by the opposite sides of the frame to extend parallel to, and at the same level as, the drive roller 40. The idler roller 44 is located between the edge 19 of top 18 and the end 12 of the frame.

The drive motor 41 and rollers 40 and 44 are parts of a first conveyor which has a plurality of flexible, endless laced conveyor belts extending between the drive roller 40 and the idler roller 44 and wrapped around both of them. When the drive motor 41 is on, in the upper course of their travel these belts move from right to left in FIGS. 1 and 2, i.e., from the trailing end at 12 to the leading end at 13 of this conveyor. Each of these belts has a return course of travel in the opposite direction (i.e., from roller 40 to roller 44) below its upper course of travel. These conveyor belts include an inner belt 50 located near the inner side 10 of the frame, second third and fourth belts 51a, 51b and 52 spaced apart in close succession laterally of this conveyor, a narrower fifth belt 53 and a similar, narrow sixth belt 54 located near the outer side 11 of the frame. As shown in FIG. 1, each of the conveyor belts 50, 51a, 51b, 52, 53 and 54 in its upper run slides across the frame top 18 from right to left. Depending on the width of the conveyor, more or less than 6 belts would be used. The function is not limited to a particular number of belts. In one practical embodiment, each of the first four belts 50, 51a, 51b and 52 has a width of $4\frac{1}{8}$ inches, each of the narrower belts 53 and 54 has a width of $1\frac{1}{2}$ inches, and the spacing between neighboring belts is 1/16 inch.

Adjusting bolts 45 and 46 act between the frame end 12 and roller 44 to enable the tension on conveyor belts 50, 51a, 51b, 52 and 53 to be adjusted.

At the top of FIG. 2, the frame supports a second motor-driven, horizontal, conveyor drive roller 140, the opposite ends of which are rotatably supported by the opposite sides 110 and 111 of the second leg of the frame. As shown in FIG. 5, a second electric motor 41 for driving roller 140 is mounted below on the frame. This motor is drivingly coupled to roller 140 through a gear reduction 142 and a pulley belt 143 in a drive arrangement of conventional design.

The idler roller for the conveyor belts which are driven by the second drive roller 140 appears near the bottom of FIG. 2 and is designated by reference numeral 144. Idler roller 144 is physically supported by the outer side 11 of the first leg of the frame for rotation parallel to that leg and at substantially the same level as the second drive roller 140.

The drive motor 141 and rollers 140 and 144 are parts of a second conveyor which has a second set of flexible, endless, laced conveyor belts extending between the second drive roller 140 and the second idler roller 144 and wrapped around both of these rollers. When the second drive motor 141 is on, in the upper course of their travel these conveyor belts move up in FIG. 2 from the idler roller 144 to the drive roller 140, i.e., from the trailing end to the leading end of this second conveyor. Each of these belts has a return course of travel in the opposite direction below its upper course of travel. This second set of conveyor belts includes an inner belt 150 located near the inner side 110 of the second leg of the frame, second and third belts 151 and 152, and narrower fourth and fifth belts 153 and 154. The wider belts 150, 151 and 152 of this second set are narrower than the wider belts 50, 51a, 51b and 52 of the first set. For example, each belt 150, 151 and 152 preferably is $2\frac{3}{4}$ inches wide when the belts 50, 51a, 51b and 52 are each $4\frac{1}{8}$ inches wide. The narrower belts 153 and 154 of the second set preferably are the same width as the narrower belts 53 and 54 of the first set, e.g., $1\frac{1}{2}$ inches wide. More or less belts would be used.

It will be evident that the trailing end of the second conveyor is overlapped with the leading end of the first conveyor at the upper course of travel of the belts of each.

The articles to be conveyed are deposited on the first set of conveyor belts 50, 51a, 51b, 52, 53 and 54 at the end 12 of the frame (the trailing end of the first conveyor) and they are carried from right to left in FIG. 1. At the corner of the "L" defined by the frame they are automatically transferred from the first set of conveyor belts onto the second set of conveyor belts 150, 151, 152, 153 and 154, which carry them to the left from this corner of the "L" over to the table 30 at the opposite end, which is the leading end of the second conveyor.

As shown most clearly in FIG. 2, at the corner of the "L" where the two conveyors overlap, successive belts of the first conveyor pass under the belts of the second conveyor generally along a line from the inside corner toward the outside corner of the "L". Thus, the first conveyor belt 50 of the first set (the one closest to the inner wall 10 of the frame) passes under the first conveyor belt 150 of the second set (the one closest to the inner wall 110 of the frame) and it continues under the second belt 151, the third belt 152, and the narrower fourth and fifth belts 153 and 154 of the second set of conveyor belts. The second and third belts 51a and 51b of the first set of conveyor belts both pass over the first belt 150 of the second set of conveyor belts and then pass under the second, third, fourth and fifth belts 151, 152, 153 and 154 of the second set. The fourth belt 52 of the first set of conveyor belts passes over the first and second belts 150 and 151 of the second set of conveyor belts and then it passes under the third, fourth and fifth belts 152, 153 and 154 of the second set.

The narrow fifth belt 53 of the first set of conveyor belts passes over the first, second, third and fourth belts 150, 151, 152 and 153 of the second set of conveyor belts and then it passes under the fifth belt 154 of the second set.

The narrow sixth belt 54 of the first set of conveyor belts passes over all of the conveyor belts 150, 151, 152, 153 and 154 of the second set at the corner of the "L".

We have found that passing both the second and third belts 51a and 51b of the first conveyor under the second belt 151 of the second conveyor is advantageous in conveying relatively long laundry articles. If such an article is substantially centered on the first conveyor (i.e., positioned midway across it) it tends to become centered on the second conveyor when it is transferred to the latter at the crossover. This avoids a natural tendency of the trailing end of such an article to hang over the inner wall 110 of the frame along the second conveyor after its direction of travel undergoes a right-angled turn from the first conveyor onto the second.

The provision of the narrower belts 53, 54 and 153, 154 along the outer side of both conveyors and the way they cross each other at the outside corner of the "L" acts to prevent small articles from falling off at this outside corner or farther along the outer side of the second conveyor. This apparently is due to the fact that each narrower belt 53, 54 of the first conveyor crosses over the corresponding belt 153 or 154 instead of under it. Consequently, the corresponding belt of the second conveyor first engages the article being conveyed at a location farther inward (i.e., away from the outside corner of the "L") than would be the case if these narrow belts of the first conveyor each crossed under the corresponding belts of the second conveyor.

As shown in FIGS. 2 and 3, the flat, generally, horizontal top 118 of the second leg of the L-shaped frame, over which the belts 150, 151, 152, 153 and 154 pass in the upper course of their travel, is formed with an opening 60 about midway along its length. This opening extends laterally beneath and beyond all five of these conveyor belts. At the trailing edge of this opening, the material of the top 118 is bent down to form a short vertical lip 61 (FIG. 3) which extends across substantially the full width of this opening. At the leading edge of this opening the top 118 presents four round-tipped teeth 62, 63, 64 and 65 which extend toward the trailing edge. Tooth 62 is centered under conveyor belt 150, tooth 63 is centered under belt 151, tooth 64 is centered under belt 152, and tooth 65 is centered midway beneath the narrower belts 153 and 154. Each tooth 62, 63 or 64 which is under one of the wider belts has opposite side edges which diverge beyond the opposite side edges of that belt in the direction of belt movement from the trailing end to the leading end of the second conveyor. Tooth 65 has opposite side edges which, in the direction of belt movement, diverge beyond the side edges of the narrow belts 153 and 154 which are remote from each other.

Where the articles being conveyed are laundry articles, such as hospital gowns with tie strings that may get caught under the conveyor belts, as these tie strings reach the opening 60 they drop down into this opening and when they reach the rounded comb teeth they slide up onto the frame top 118 on one side or the other of the conveyor belts under which they were caught before reaching the opening 60. Consequently, such tie strings will not get caught on the driver roller 140 at the leading end of the second conveyor.

We claim:

1. A conveyor assembly comprising:

a first conveyor having a trailing end and a leading end and comprising a first set of elongated, flexible, endless belts having an upper course of travel from said trailing end to said leading end and a return course of travel in the opposite direction below said upper course, the belts of said first set being positioned in succession laterally and being substantially coplanar in said upper course of travel for conveying an article from said trailing end to said leading end of the first conveyor;

and a second conveyor extending transverse to said first conveyor and having (a) a trailing end overlapped with said leading end of the first conveyor and forming therewith an inside corner and an outside corner, and (b) a leading end located away from said first conveyor on one side of said first conveyor, said second conveyor comprising a second set of elongated, flexible, endless belts having an upper course of travel from said trailing end of the second conveyor to said leading end thereof and a return course of travel in the opposite direction below said last-mentioned upper course, the belts of said second set being closely positioned in succession laterally and being substantially coplanar in their upper course of travel for receiving an article from said first conveyor at the latter's leading end and conveying the article from said trailing end of the second conveyor to the leading end thereof;

a plurality of successive belts of said first set passing under the belts of the second set generally along a line from said inside corner toward said outside corner where the trailing end of the second conveyor is overlapped with the leading end of the first conveyor;

said first conveyor at its leading end having first, second, third, fourth, fifth and sixth belts spaced apart laterally in succession from said inside corner toward said outside corner, said fifth and sixth belts being substantially narrower than said first, second, third and fourth belts;

said second conveyor at its trailing end having first, second, third, fourth and fifth belts spaced apart laterally in succession from said inside corner toward said outside corner, said fourth and fifth belts of the second conveyor being substantially narrower than said first, second and third belts of the second conveyor;

said first belt of the first conveyor passing under all of the belts of the second conveyor where the trailing end of the second conveyor is overlapped with the leading end of the first conveyor;

said second and third belts of the first conveyor passing over said first belt of the second conveyor and under the second, third, fourth and fifth belts of the second conveyor;

said fourth belt of the first conveyor passing over said first and second belts of the second conveyor and under the third, fourth and fifth belts of the second conveyor;

said fifth belt of the first conveyor passing over said first, second, third and fourth belts of the second conveyor and under the fifth belt of the second conveyor;

and said sixth belt of the first conveyor passing over all of the belts of the second conveyor;

said first, second, third and fourth belts of the first conveyor being substantially the same width as each other and are substantially wider than said first, second and third belts of the second conveyor;

and a rigid support for said second conveyor presenting a substantially flat top piece immediately below said second set of belts in said upper course of their travel, said top piece having an opening therein between said trailing and leading ends of the second conveyor which extends laterally across the combined width of said belts, said top piece at the front end of said opening presenting a plurality of laterally spaced teeth which project toward the opposite end of said opening.

2. A conveyor assembly according to claim 1 wherein:

one of said teeth is substantially centered between said fourth and fifth belts of the second conveyor and has opposite side edges which diverge laterally beyond the mutually remote side edges of said fourth and fifth belts in the direction of belt movement from the trailing end to the leading end of the second conveyor;

and the remaining teeth are substantially centered individually below said first, second and third belts of the second conveyor and have opposite side edges which diverge laterally beyond the opposite side edges of the corresponding belts in the direction of belt movement from the trailing end to the leading end of the conveyor.

3. A conveyor assembly according to claim 2 wherein said teeth have rounded tips.

4. A conveyor assembly comprising:

a first conveyor having a trailing end and a leading end and comprising a first set of elongated, flexible, endless belts having an upper course of travel from said trailing end to said leading end and a return course of travel in the opposite direction below said upper course, the belts of said first set being spaced apart in succession laterally and being substantially coplanar in said upper course of travel for conveying an article from said trailing end to said leading end of the first conveyor;

a second conveyor extending transverse to said first conveyor and having (a) a trailing end overlapped with said leading end of the first conveyor and forming therewith an inside corner and an outside corner, and (b) a leading end located away from said first conveyor on one side of said first conveyor, said second conveyor comprising a second set of elongated, flexible, endless belts having an upper course of travel from said trailing end of the second conveyor to said leading end thereof and a return course of travel in the opposite direction below said last-mentioned upper course, the belts of said second set being closely spaced apart in succession laterally and being substantially coplanar in their upper course of travel for receiving an article from said first conveyor at the latter's leading end and conveying the article from said trailing end of the second conveyor to the leading end thereof;

a plurality of successive belts of said first set passing under the belts of the second set generally along a line from said inside corner toward said outside corner where the trailing end of the second conveyor is overlapped with the leading end of the first conveyor;

and a rigid support for said second conveyor presenting a substantially flat top piece immediately below said second set of belts in said upper course of their travel, said top piece having an opening therein between said trailing and leading ends of the second conveyor which extends laterally across the combined width of said belts, said top piece at the front end of said opening presenting a plurality of laterally spaced teeth which project toward the opposite end of said opening.

5. A conveyor assembly according to claim 4 wherein at least certain of said teeth are substantially centered below said belts and have opposite side edges which diverge laterally beyond the opposite side edges of the corresponding belts in the direction of belt movement from said trailing end to said leading end of the second conveyor.

6. A conveyor having a trailing end and a leading end and comprising a set of elongated, flexible, endless belts having an upper course of travel from said trailing end to said leading end and a return course of travel in the opposite direction below said upper course, the belts being spaced apart in succession laterally and being substantially coplanar in said upper course of travel for conveying an article from said trailing end to said leading end of the conveyor;

a rigid support for said conveyor presenting a substantially flat top piece immediately below said conveyor belts in said upper course of their travel, said top piece having an opening therein between said trailing and leading ends of the conveyor which extends laterally across the combined width of said belts, said top piece at the front end of said opening presenting a plurality of laterally spaced teeth which project toward the opposite end of said opening.

7. A conveyor according to claim 6, wherein said teeth have rounded tips and diverging opposite side edges.

8. A conveyor according to claim 6, wherein at least certain of said teeth are substantially centered individually below said belts and have diverging opposite side edges which extend laterally beyond the opposite side edges of the corresponding belts in the direction of belt movement from the trailing end to the leading end of the conveyor.

9. A conveyor according to claim 6 wherein:
said belts of the conveyor include a pair of narrow, closely spaced belts;
and one of said teeth is substantially centered between said pair of belts and has opposite side edges which diverge beyond the side edges of said pair of belts which are remote from each other.

10. A conveyor according to claim 7 wherein:
said belts of the conveyor include a pair of narrow, closely spaced belts, and the remaining belts are substantially wider than the belts of said pair;
one of said teeth is substantially centered between said pair of narrow belts and has opposite side edges which diverge beyond the side edges of said pair of narrow belts which are away from each other;
and the remaining teeth are substantially centered indvidually below said wider belts and have opposite side edges which diverge laterally beyond the opposite side edges of the corresponding belts in the direction of belt movement from said trailing end to said leading end of the conveyor.

* * * * *